United States Patent
Vanden Langenberg et al.

(10) Patent No.: US 6,629,917 B2
(45) Date of Patent: Oct. 7, 2003

(54) SEALER APPARATUS FOR PLASTIC FILM PROCESSING INCLUDING AN ADJUSTABLY MOUNTED SEAL BAR, PARTICULARLY FOR BAG MAKING MACHINES

(75) Inventors: Thomas G. Vanden Langenberg, Green Bay, WI (US); Giles R. Blaser, Green Bay, WI (US)

(73) Assignee: Amplas, Inc., Green Bay, WI (US)

( * ) Notice: Subject to any disclaimer, the term of this patent is extended or adjusted under 35 U.S.C. 154(b) by 105 days.

(21) Appl. No.: 09/872,050

(22) Filed: Jun. 1, 2001

(65) Prior Publication Data

US 2001/0041656 A1 Nov. 15, 2001

Related U.S. Application Data

(63) Continuation-in-part of application No. 09/420,248, filed on Oct. 19, 1999.

(51) Int. Cl.[7] ............................................. B31B 49/04
(52) U.S. Cl. ........................ 493/189; 493/197; 493/205; 493/209
(58) Field of Search ................................. 493/189, 197, 493/205, 209, 186, 215, 475, 478, 479

(56) References Cited

U.S. PATENT DOCUMENTS

| | | | | |
|---|---|---|---|---|
| 4,662,864 A | * | 5/1987 | Lehmacher | 493/204 |
| 4,692,134 A | * | 9/1987 | dos Santos Copia | 493/196 |
| 4,692,135 A | * | 9/1987 | Johnson | 493/394 |
| 4,994,137 A | * | 2/1991 | Yanai | 156/515 |
| 5,021,039 A | * | 6/1991 | Richter et al. | 493/14 |
| 6,422,986 B1 | * | 7/2002 | Claybaker et al. | 493/189 |

* cited by examiner

*Primary Examiner*—Eugene Kim
(74) *Attorney, Agent, or Firm*—Andrus, Sceales, Starke & Sawall, LLP

(57) ABSTRACT

A cross sealer for a plastic bag making machine includes a frame with an upper moveable seal bar unit and an opposed lower stationary seal bar unit. The movable unit is a lightweight construction seal beam. A rotating shaft spans the cross sealer and is connected by a plurality of eccentric linkages to the seal beam. The linkages moves a seal bar into sealing engagement across the width of the web to the seal bar unit constructed with a support beam and a seal bar connected to the beam. The seal bar unit is mounted as a substantially stationary unit during sealing and is supported by a plurality of air cylinder units for positioning from standby to an operating position. Each air cylinder unit includes an adjustable stop unit secured to the back of the cylinder unit and connected to the cylinder piston for adjusting the movement of the piston and thereby the operative sealing position of the stationary seal bar unit. Some air cylinder units are connected to the seal bar unit for positively moving the same and others additionally includes pad abutting the seal bar units for supporting the same between the two positions.

11 Claims, 3 Drawing Sheets

SEALER APPARATUS FOR PLASTIC FILM PROCESSING INCLUDING AN ADJUSTABLY MOUNTED SEAL BAR, PARTICULARLY FOR BAG MAKING MACHINES

This is a CIP of Ser. No. 09/420,248 filed Oct. 19, 1999. This invention relates to a sealer apparatus and particularly to cross sealers and presealers for forming thermal seals of layered plastics which extend across relatively wide webs, and particularly in bag making machines.

BACKGROUND OF THE INVENTION

The processing of plastic webs into bags and other like plastic members may include a relatively wide web passed through a single machine to form a plurality of bags or other members. The plastic layers in the web are sealed to each other along lines generally extended across the web by passing of the wide web through a cross sealer or a presealer having opposed seal bars spanning the web and in which the web is moved in stepped sequence. During a short seal period, the web is clamped between the seal bars to provide a thermal seal of the webs to each other. Generally, prior art cross sealers and presealers included opposed movable seal bar units which span the entire seal width of the machine. The movable seal bar structures are supported for reciprocal movement into and from engagement with each other. The movable seal bar units are secured at one end or both ends to a drive unit. A cam driven mechanism and the associated connections to the seal bars are driven by an appropriate power system such as an AC motor drive, a servo motor drive or even an air cylinder drive. The cam driven mechanism includes separate cam assemblies at each side plate of the machine with the cam assemblies secured to the opposite ends of a single rotating shaft. The respective cam assemblies are coupled to the outer ends of the seal bar and designed to move the heavy seal bar and establish an adequate seal pressure to affect the desired seal over the entire seal width of the machine. Another design has included multiple air cylinders spaced across the seal bars. The prior art machines require relatively massive seal bar structures which establish an extremely rigid bar because of the high operational seal pressures required and to produce and maintain an even pressure across the length of the seal bar. The combination of the various parts creates so much inertia that a relatively slow rate of movement is required and with a dwell control, the machine speed is significantly limited. AC motors, in particular servo motor drives, produce a better control of the sealer mechanism and particularly the movable seal bar during the start/stop sequence. The performance is not considered adequate to fully provide in-line compliant seal bar movement with a modern bag making machine. Attempts made to increase the speed of the prior art sealers resulted in significant increase in maintenance problems and associated downtimes.

A typical prior art cross sealer assembly with the wide cross seal bars often include a cloth covering applied to the seal surfaces of the seal bars to avoid attachment of the plastic webs to the sealing faces of the opposed seal bars. In such constructions, the cloth assembly is secured to the frame structure with a source roll of the cloth secured to one side of the seal bar. The cloth passes therefrom across the seal surface of the seal bar to a take-up roll which is rotatably mounted to the opposite side of the seal bar unit. Similar cloth assemblies are provided for both the upper and lower seal bar units. The cloth is typically a TEFLON material (trademark of E.I. duPont de Nemours and Company of Delaware, USA).

The wide web is often used where a plurality of laterally spaced members are formed within the single web to increase the production of product. Such machines are well known in the bag making machine for pouches and like plastic containers. A typical machine for example which had been commercially available had a web width of 1,240 millimeters. Although satisfactory bag making machines using wide cross sealers or presealers have been designed and sold, there is a need for improved cross sealers constructed to operate in a more rapid cycle time while maintaining the creation of acceptable cross seals of the plastic laminates.

The stationary seal bar unit is presently mounted within the system through a plurality of fluid cylinder units which are mounted between the frame and the seal units. It is important that the seal bar be precisely located in the operative position to affect an optimal seal of the web. The positioning may vary with the particular web material, the thicknesses of the web and the like.

In the prior art, the stationary seal bar unit is mounted with mount members and interposed fluid or as cylinder units to move the stationary seal bar unit between a seal position and alternatively in a retracted standby position.

SUMMARY OF THE INVENTION

The present invention is particularly directed to the construction of a substantially stationary seal bar unit of a wide plastic sealer machine which operates with an opposed movable seal bar structure. The movable seal bar preferably has a low inertia and is supported by a multiple of spaced mechanical linkages secured to a shaft of a common drive mechanism connected across the sealer apparatus. The rotating shaft is driven by an appropriate system, preferably a servo motor drive or a pneumatic cylinder drive, for rotating of the shaft and thereby raising and lowering of a seal bar in repetitive cycles through the spaced mechanical linkages. The multiple interconnecting mechanisms are preferably eccentric link unit or individual cam units mounted in spaced relation across the width of the sealer structure and attached to support a rigid support beam or like support structure for vertical movement. A light seal bar is secured to the support structure for movement into operative engagement with an opposed substantially rigid stationary and rigid support structure including an opposed seal bar. The seal bar is moved during the seal cycle while the substantially stationary seal bar unit does not add to the inertia of the overall seal moving system.

The present invention is directed to a construction of a substantially stationary sealed bar unit which is mounted relative to the movable seal bar unit and with the support for the stationary seal bar unit providing for limited retractive movement and relative adjustment of the operating position with respect to the movable seal bar unit. The present invention is particularly directed to the mounting support of the stationary seal bar unit within any rigid support structure. In accordance with the invention, a plurality of adjustable fluidic cylinder units secure the stationary sealed bar unit to the rigid supporting structure. Each of the fluidic cylinder units includes a fluidic cylinder which is mounted in fixed relation to the rigid support structure in alignment with a pre-determined location of the seal bar unit. The piston rod projects from the cylinder of the unit and is fixedly attached to the seal bar unit. The piston rod is secured to the cylinder piston. An adjustable piston rod is coupled to the opposite side of the piston and extends outwardly of the opposite end of the cylinder, which includes a stop wall encircling the piston rod. The outer end of the piston rod and the cylinder unit include an adjustable stop which limits movement of the piston rod. In a preferred construction, the outer end of the piston rod includes a threaded portion with a stop wall on the cylinder encircling the piston and extending outwardly from the cylinder unit. A stop nut is threaded onto the threaded portion and provides for restricted movement of the piston rod and the attached piston. This provides adjustment of the initial setting of the sealed bar unit in the effective sealing position as well as providing a proper retraction motion of the seal bar upon interruption of a sealing operation.

Thus each cylinder unit is constructed and configured for connection to the seal bar to support the seal bar in the sealing position to provide a substantially firm fixed support, but preferably allowing very limited cushioning response such that during normal operation, very slight penetration and lost motion of the seal bar is permitted. Thus the air cylinder unit functions essentially as a fixed support of the seal bar with a slight cushioning action as well as incorporating a physical repositioning of the seal bar between the operative sealing position and a retracted stand by position as well as maintaining a slight cushioning action during the operative cycle. The present invention provides an adjustable fluidic support of the relatively stationary seal bar unit, but permits the necessary repositioning and motion during a sealing operation to produce an improved thermal seal within the web.

The present invention with the multi-adjustable fluidic support across the seal bar unit produces an improved thermal seal.

The structure provides a simple, inexpensive and reliable means for interconnection into a production bag forming machine or other sealing apparatus and thereby increases the reliability and accuracy of production provided by the sealer.

Various other features, objects and advantages of the invention will be made apparent from the following description taken together with the drawings.

BRIEF DESCRIPTION OF THE DRAWINGS

The drawings illustrate the best mode presently contemplated for carrying out the invention.

In the drawings.

DETAILED DESCRIPTION OF THE INVENTION

Figure 1:
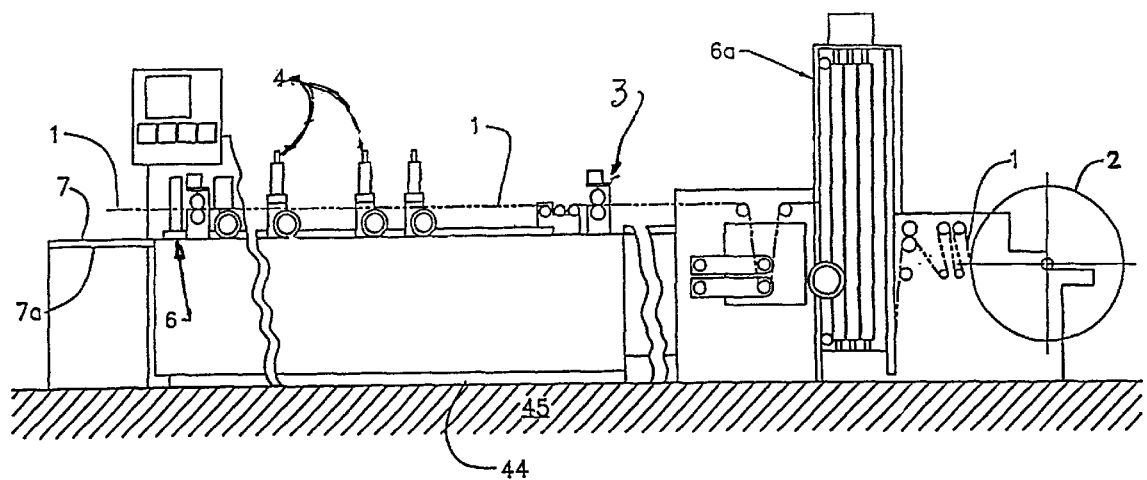
FIG. 1 is a diagrammatic illustration of a bag making line incorporating a sealer apparatus constructed in accordance with the present invention.
Figure 1A:
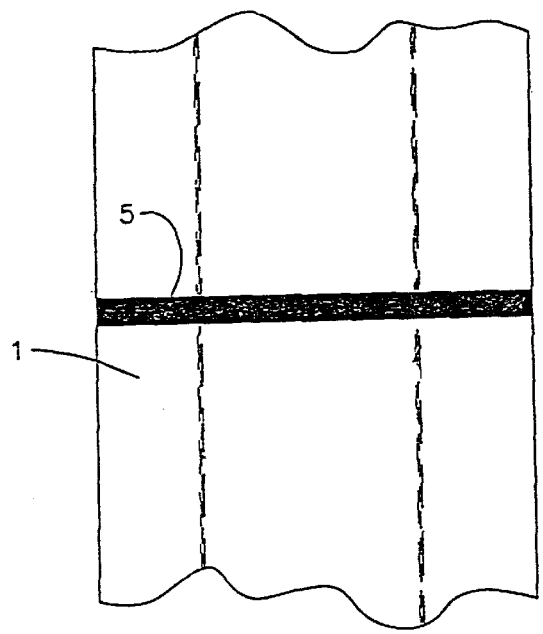
FIG. 1a is a diagrammatic view of a portion of a sealed web.

Referring to the drawings and particularly to FIG. 1, a bag making machine is illustrated in a simplified illustration, which is more fully described in the copying application. A multi-layered plastic web 1 is drawn from a suitable supply such as a web roll 2 which is mounted within the machine with a draw roll unit 3. The web is fed from the web roll 2 into a series of stations, which may provide various processing of the web such as imprinting of the web with appropriate material, heating and cooling of the web, various tension controls, cutting of the web to form bags, and other well known processes. The web 1 may have a width equal to a plurality of individual final bag members to be formed from successive portions of the web 1 (FIG. 1a). The web is fed from the roll 2 into a seal assembly 4 particularly constructed in accordance with the teaching of the present invention to form a seal or seam 5 extended completely across the web 1. The sealed web passes into a cutter unit 6 in which the leading portion of the web is severed along the seal line to remove the leading portion of the web and form bags 7 which are stacked on a table 7a.

The above described systems of forming the side-by-side webs of tubular construction or with an open side construction is conventional and well known, with a preferred construction fully described in the cross-referenced application.

As referenced herein, a multi-layered plastic web can therefor be formed in any desired system. The web may be withdrawn in a tubular form, or formed as a folded single web. Alternatively, entirely separate webs can be multi-layered and passed in superimposed relation through the line. Further a plurality of individual lines can be passed through the system in side-by-side relation in any desired system. The present invention is thus broadly directed to any system particularly a bag making system, where there is a requirement for sealing of a overlying plastic element to each other across the width thereof and which is of relatively wide width and with the use of a thermal heating system.

The illustrated embodiment of the invention is therefore particularly directed to an improved plastic sealing apparatus and method for forming of plastic bags and a preferred embodiment is illustrated more fully in FIGS. 2–6, inclusive. In this embodiment, the plastic web is a folded web with the individual side-by-side webs to have one side open and the opposite side sealed. The seam 5 thus forms the sides of the bags 7. The cutter unit 6 is therefor centered on the seal seam 5 and forms the adjacent sides of adjacent bags 7.

Figure 2:
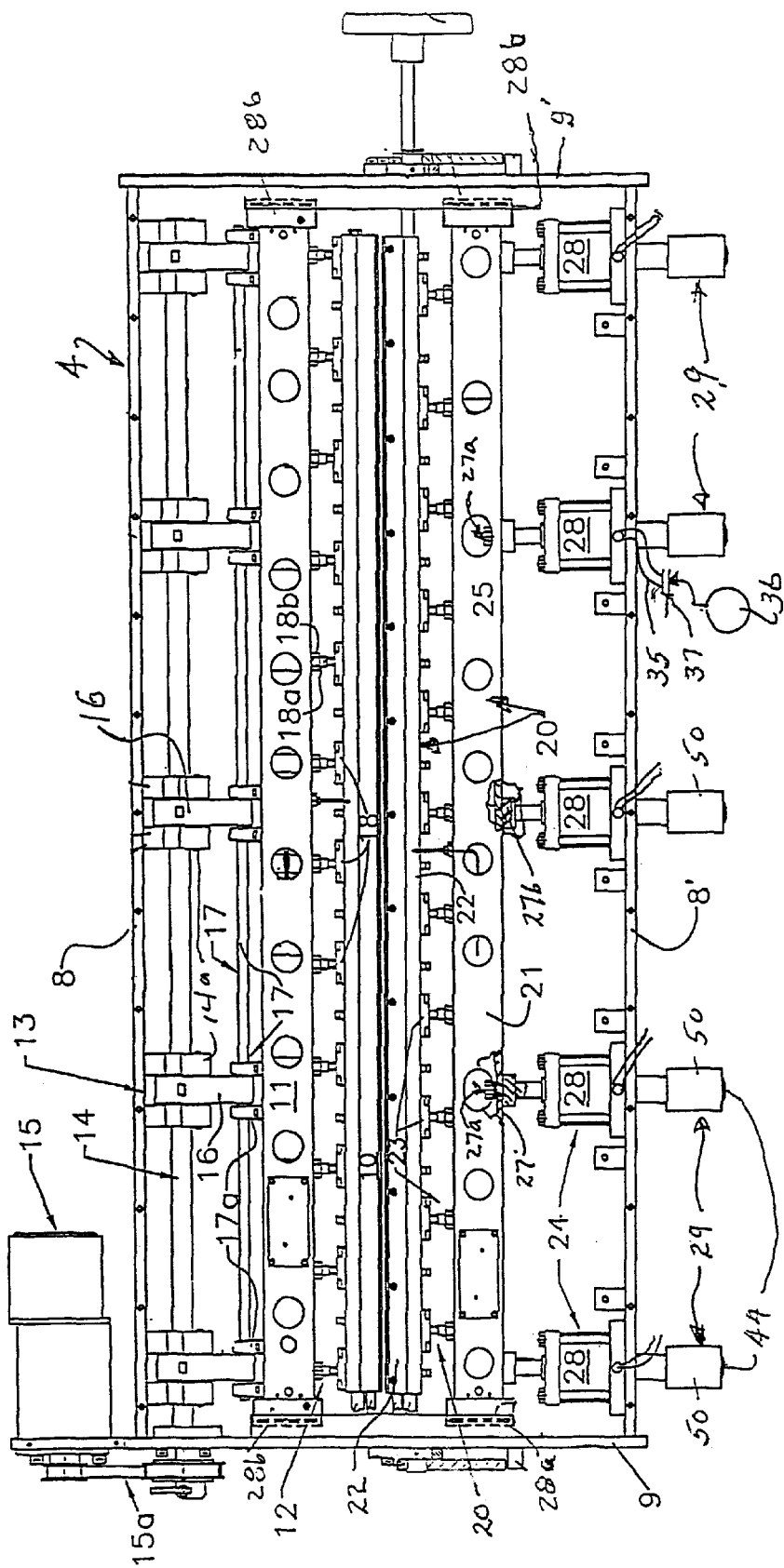
FIG. 2 is front elevational view of a sealer machine for a system of FIG. 1.
Figure 3:
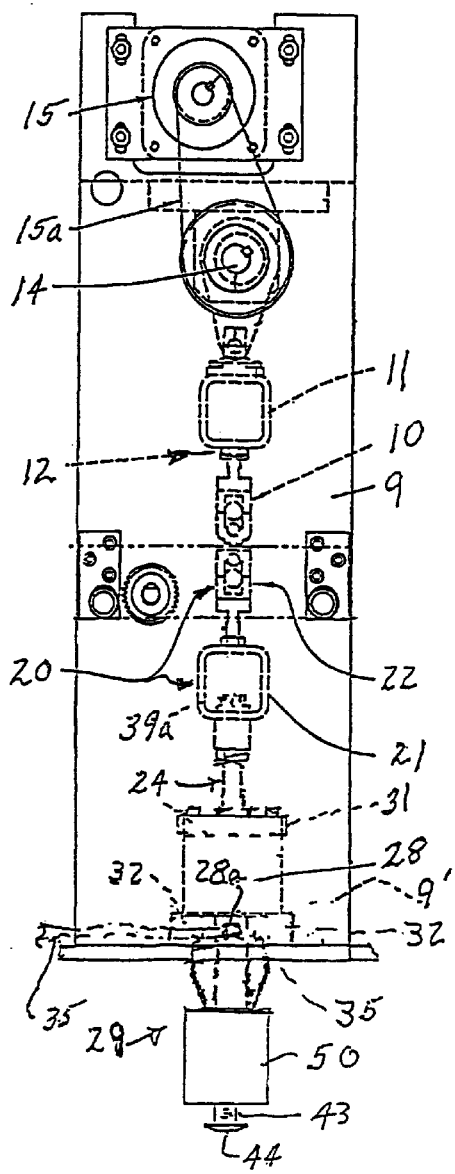
FIG. 3 is a side elevational view taken from the left side of FIG. 2 of the sealer machine.
Figure 4:
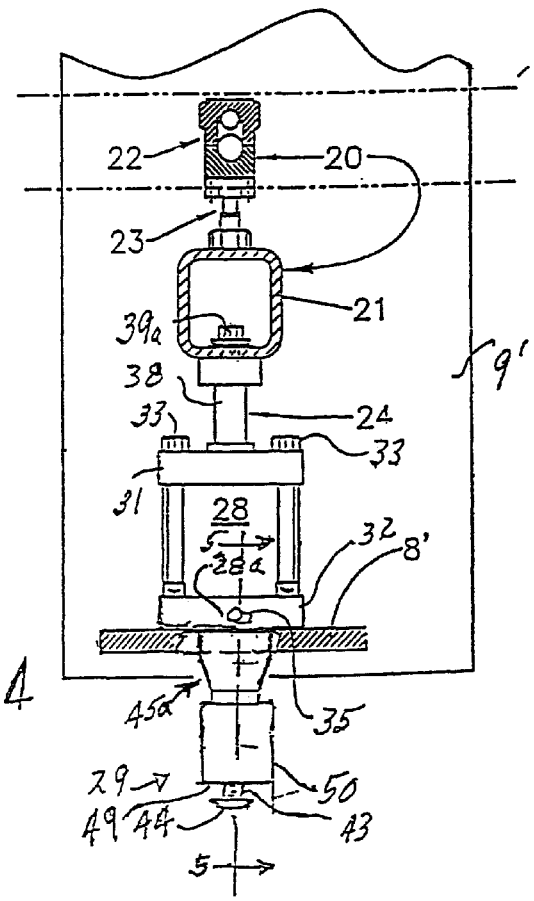
FIG. 4 is a partial enlarged view of a stationary seal bar unit and its support shown in FIGS. 2–3 with parts in section.

Referring particularly to FIGS. 2, 3 and 4, the illustrated embodiment of the present invention includes a basic frame structure for mounting of the forming and operating mechanism through which the web 1 is passed through seal assembly or unit 4. The illustrated frame structure consists of an encircling rigid frame including an upper frame member 8 and a lower frame member 8' which are in vertical aligned relation and interconnected to each other by side frame members or plates 9 and 9', respectively. A vertically moving upper seal bar member 10 is located within the frame and interconnected to an upper seal support beam 11 to form a movable seal bar unit 12. The upper seal unit or assembly extends laterally substantially throughout the width of the seal unit 4 between the plates 9 and 9'. Seal support beam 11 is connected and supported within the upper frame by a plurality of laterally spaced eccentric drive units 13 which are connected to and driven by a rotating shaft 14. The shaft is supported by bearings 14a adjacent each eccentric unit 13. A servo motor 15 is coupled through a drive coupling or connector 15a to rotate shaft 14 and provide a vertical movement of the seal bar unit 12. The shaft 14 is rotatably mounted between the end plates 9 and 9' and each of the eccentric drive units 13 is direct coupled at each support position between the shaft 14 and the beam 11. As shown in FIGS. 2 and 3, each eccentric drive unit 13 includes a link 16 mounted on the eccentric shaft 14. Bearings 14a at each eccentric unit 13 are secured to the frame 8 and rotatably support the shaft 14 to each side thereof and confine the link 16 of unit 13 therebetween. An eccentric bushing, not shown, is keyed to the shaft 14, or the shaft is integrally formed with such bushing, with its center offset from that of shaft 14, such that rotation of the shaft 14 and bushing results in vertical reciprocal movement of the link 16 which is interconnected to the seal support beam 11.

The eccentric link 16 is directly secured to the seal beam 11 by a wrist pin rod 17. The lower end of link 16 is attached to rod 17 with a bearing unit 17a located to the opposite sides of the link 13 and fixed to beam 11. The eccentric drive units 13 are relatively compact short assemblies which significantly reduces the spacing between the drive shaft and the seal beam and thereby the overall height of the seal bar assembly.

The seal beam 11 is connected to the seal bar 10, which has a slightly shorter length than the seal beam and the connection is made by a plurality of connecting mechanisms or units 18 to rigidly interconnect the bar 10 to the beam 11 at a plurality of relatively close spaced locations. The connecting units 18 illustrated include adjustment threaded studs 18a connected to the seal bar 10. A nut 18b is connected to the beam and threads onto the stud. This provides for vertical positioning of the seal bar 10 relative to the beam 11. The units 18 are located preferably equispaced across the seal bar between the very ends of the seal bar, with a plurality of the units between each of the link units 13. As shown, the seal bar 10 is slightly shorter in length than the beam 11 and the end units 18 are spaced inwardly on the beam. This provides a rigid support for the seal bar 10 while allowing some deflection of the seal bar 10, as more fully developed hereinafter.

The total assembly is preferably made of a relatively lightweight construction particularly for the moving part of the seal bar assembly. The illustrated beam 11 is a conventional square beam box-like member. The top and bottom may be formed as solid members to accommodate the interconnection to the various parts.

The rotation of the eccentric drive shaft 14 results in a vertical reciprocating movement of the beam 11 and a corresponding positioning of the seal bar 10 to locate the interconnected seal bar 10 between a raised position where it is spaced from an aligned bottom seal bar unit 20 and a lowered position where it is in operative sealing engagement with web 1 and the seal bar unit 20. Thus, the rotational movement of the eccentric shaft 14, and all of the links 16 of units 13, provide for appropriate vertical reciprocation of the seal bar 10 relative to the lower seal bar unit 20.

The lower seal bar unit 20 is constructed substantially similar to the upper seal bar unit. Thus the lower seal bar unit again includes a support beam 21 of the construction corresponding to that of the upper beam 11 and connected to a lower seal bar 22 by a plurality of connectors 23 in the same manner as the upper seal bar unit to locate the seal bar unit relative to the beam. Referring to FIGS. 2–3, the lower seal bar unit 20 is further held in a substantially stationary orientation with respect to the upper seal bar unit 12 by a plurality of fixed fluidic cylinder units 28, depending on the width of the machine and preferably using air spaced across the bar unit 20. The cylinder units 28 are secured and/or coupled to the underside of seal beam 21 as at 27 and a bottom support member 25. In a preferred construction, the system includes two spaced cylinder units 28 which are fixed to the bottom wall 27 of the beam 21 by a pad and bolted connection as at 27a. The other three interspaced cylinder units have only an upper pad 27b which abuts the bottom wall of the beam 21 but is not fixed thereto in the illustrated embodiment with five cylinder units. Two cylinder units are adequate for positioning the illustrated seal bar unit 20. In a narrow apparatus which has only three cylinders, the outer two units are bolted or otherwise firmly attached in place and the center unit provided with the pad. Generally, at least some of the units are preferably affixed to the seal beam unit. The cylinder units 28 form three functions. The air cylinder units include a controlled input connection 28a to provide for controlled raising of the seal bar 22 to the operative position and controlled lowering of the lower seal bar unit 20 from the operative position particularly during a non-operative period of the bag making process. The lowered seal bar 22 is then supported spaced from the web path by the cylinder units when the machine operation is stopped. This will avoid overheating of the aligned web while in the machine. In the normal seal cycle, the air cylinder units 28 further act as cushioning members to allow some slight penetration and lost motion. In a practical application the lost motion is on the order of five to ten thousandths (0.005–0.010) of an inch movement. In addition, the air cylinder units of the present invention incorporate an adjustable connection unit between the seal bar 22 and the support to accurately set the spacing of the seal bar 22 of unit 20 relative to the reciprocating seal bar 12.

The proper positioning of the seal bar units 12 and 20 is significant in order to establish an appropriate and desired interengagement between the seal bars 10 and 22 during the normal heating cycle of the bag web 1 in order to establish the desired seal depending upon the thickness and characteristic of the plastic material being sealed to each other.

As illustrated in FIG. 2 both upper and lower seal bar units 12 and 20 are guided in motion by guide blocks 28b and 28c and are basically of an identical construction consisting of the very lightweight but relatively strong seal beams 11–21 and seal bars 10–22.

The relatively light overall weight support in combination with the multiple eccentric drive units 13 establish very uniform raising and lowering forces across the seal bar assembly, with the only moving structure being that of the low inertia upper seal bar unit.

The illustrated air cylinder support structure for the lower seal bar unit 20 in combination with the lightweight movable upper seal unit 12 permits rapid movement within the seal cycle without generation of noise or vibration while producing a highly effective even cross seal across the plastic web 1. The adjustment units or connectors 18 and 23 provide for precise location of the seal bar units, and particularly opposed bars 10 and 22, relative to each other and create a more optimal operation in sealing.

As illustrated in the preferred construction, the lower and upper adjustment units or connectors 18 and 23 for the movable seal bar, are similarly equispaced and further are staggered relative to each other as shown. Thus, each set is located in equal spaced relation to each other but offset to align the lower adjustment connectors 23 substantially centrally between the location of the upper connectors 18. This permits some relative deflection of the seal bars 10 and 22 relative to each other and tend to offset the deflection of the seal bars. The result of this construction and configuration is that the seal bars more fully conform to each other during a seal cycle and thereby assure a better seal and improve the integrity of the final seals.

In summary, the illustrated structure of the seal bar units minimizes the total inertia in the moving portion of the sealing structure when contrasted to systems of conventional construction, particularly wherein both the upper and lower seal bars move. The multiple linkages provided across the width of the seal bar units promote establishing and maintaining of a constant seal pressure across the total width of the machine which is independent of the machine width. Thus, the linkages are spaced appropriately and if a wider machine is built additional linkages are provided to maintain the desired seal pressure. Further, the actual location of the eccentric support devices with the adjustable connections permit the relative positioning of the seal bar unit in accordance with the thickness or thinness of the plastic material as well as for different plastics. Thus, various plastics may require different heating and pressures. Further, plastic materials such as found in bubble pack or foam plastics are generally thicker and require a different web seal relationship between the seal bars then that required for relatively flat and relatively thin plastics.

Detail of the illustrated embodiment with respect to the moving seal bar unit and the stationary seal bar units is more fully set forth in the parent application. The present invention is particularly directed to the support of the stationary seal bar unit 20, and particularly, the mounting and functioning of the unit 20. Further, detail of the moving seal bar unit may be found in the parent application.

The lower and stationary seal bar unit 20 is preferably formed of a generally identical construction to that of the upper seal bar unit 12 with corresponding elements identified by corresponding primed numbers. The lower seal bar unit 20 however is not necessarily formed with the similar lightweight construction but the construction is desired in order to provide for the slight lost motion movement, and the retraction when the line is not running and the like without increasing the stresses within the operating mechanism.

Referring to FIGS. 2–3, the lower seal bar unit 20 is held in a substantially stationary orientation with respect to the upper seal bar unit 12 only by the plurality of fluidic cylinder units 28 which are spaced across the lower seal bar unit. Each of the cylinder units 28 is similarly secured to the underside of the seal beam 21 of seal bar unit 20 and to a rigid bottom support member of the outer basic frame structure, particularly to the lower frame member 8'. In addition to the other variation, the relative position of the seal bar units 12 and 20 are adjusted for the thickness and other characteristics of the plastic web.

Figure 5:
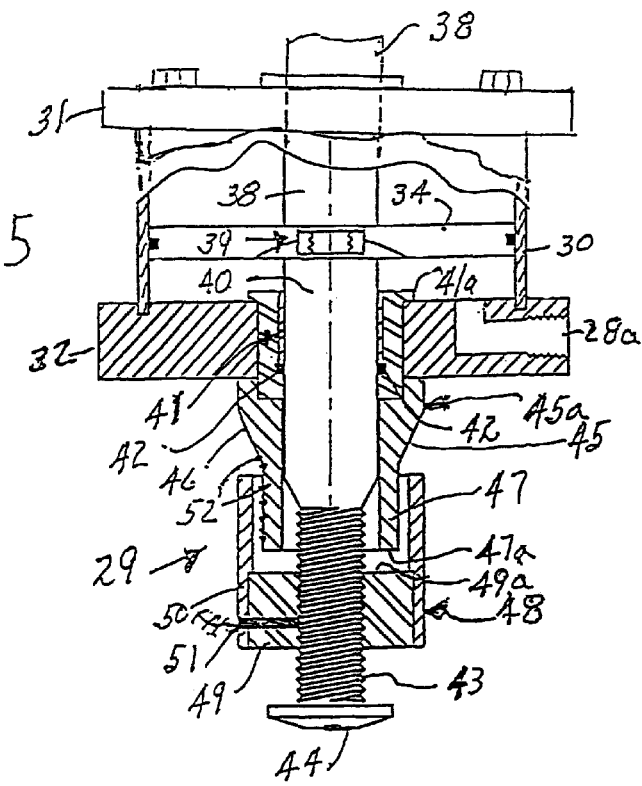
FIG. 5 is an enlarged fragmentary portion view taken generally on line 5—5 of FIG. 4 with parts broken away and sectioned to more clearly disclose details of construction on the lower seal bar support.

Referring to FIGS. 3–5, each cylinder unit 28 includes an adjustable positioning unit 29 for setting the position of the seal bar 22 relative to the reciprocating seal bar 12 in the operative position. In addition, in the illustrated embodiment, the cylinder units 28 also provide for retraction of the seal bar unit 20 during the nonoperative period of the bag making line 18. In the operative position, the cylinder units 28 provide a slight cushioning response to allow some slight penetration and lost motion during the sealing engagement of the seal bar 12 and 22. The cylinder units 28 in addition to providing the necessary rigidity of the seal bar unit 20 provides the above additional two functions.

The present invention thus provides an adjustably mounted seal bar which is a relatively fixed mounting with respect to a reciprocating seal bar, with the adjustable fluidic cylinder units 28 interconnecting the stationary seal bar unit to the frame structure to provide for the desired positioning of the fixed seal bar relative to the movable seal bar unit and in the preferred embodiment providing the triple function of appropriately supporting the fixed seal bar unit with a cushioning response as well as providing for adjustment of the spacing of the fixed seal bar relative to the movable seal bar through the simple use of the fluidic cylinder units.

As used herein, fluidic cylinders include cylinder units using a generally limited compressible fluid such as air and other gaseous fluids which function essentially as air to provide the accurate positioning and supporting of the seal bar while providing for the desired cushioning effect. In the preferred construction, air is used.

As more clearly illustrated in FIGS. 2–5, and particularly FIG. 5, the present invention is particularly directed to the cylinder unit 28 including the seal bar adjustment control unit 29 interconnected into the cylinder unit 28.

The cylinder unit 28 includes an outer cylinder 30 having a top plate 31 and a bottom plate 32 with a plurality of interconnecting corner bolts 33 securing the plates in sealed relation to the opposite ends of the cylinder in a more or less conventional construction. A piston 34 is slidably mounted within the cylinder 30 as illustrated in FIG. 5. Referring to FIG. 2, an air line 35 is connected to each of the bottom plate 32 by a threaded connection. The air lines 35 are connected to a common pressurized air source 36 with a common suitable control 37 for supplying air to the cylinders and for exhausting air from the cylinders for positioning of the unit 20.

As illustrated in FIGS. 4 and 5, the cylinder unit is secured to the bottom frame 8' by any suitable means. A piston rod 38 is secured to the piston 34 within the cylinder as at 39 and moves with the piston. The rod 38 extends outwardly through a sealed opening in the upper plate. The upper end of the rod on the two intermediate cylinder units 28 are fixedly secured thereto by the threaded connection 27a, as previously set froth, while the other three have pads 27b which press directly on the aligned beam without connection thereto. This provides the necessary interconnection of the two piston rods 38 to the beam 21 and the supporting engagement of the other three units 28. This provides for the necessary precise following movement of the beam 21 and therefore the interconnected lower sealing bar unit 22 for positioning thereof in a commercial unit.

For controlling and adjusting the position of the seal bar unit 22 the adjustable control unit 29 is secured to the lower end of the cylinder and particularly to the lower cylinder plate 32. As is more clearly shown in FIG. 5, the adjustment unit 29 includes piston rod 40 as an extension of rod 3 8 secured to the opposite or bottom side of the piston 34 as at 39. The rod 40 extends downwardly through the bottom plate 32 and an opening in the mounting frame 8'. The opening in the cylinder plate 32 includes an inner slide bearing unit or bushing 41 having a flange 41a abutting the inner wall of the plate. The rod 40 extends through the bearing unit for sliding support of the rod. A bearing seal 42 is located at the inner end of the bushing 41 and seals the opening to confine the air to the cylinder unit via the passageway and the interconnection to the air supply. The rod 40 extends outwardly of the bushing 41 with the outermost end formed as a reduced diameter end having a threaded portion 43. The outermost end of the piston rod terminates in an end stop cap 44.

A stop tube 45 is secured to the underside of the bottom plate 32 with a recessed base 45a overlying the bearing unit or bushing 41 and abutting the underside of the bottom plate 32. The guide stop tube 45 extends outwardly with a tapered portion 46 extending over the base and tapering downwardly to an outer tubular portion 47 projecting outwardly over the inner threaded portion 43 of the piston rod 40 in the illustrated position of piston 34 and ends in a flat end wall 47a. An outer enclosure member 48, which is generally cup shaped, has a nut 49 which threads onto threaded portion 43. An outer tubular wall or skirt 50 is secured to the nut 49 and projects inwardly in telescoping and radially spaced relation over the tubular portion 47 of the stop tube 45 to form an enclosure with a space therebetween.

The stop nut 49 is selectively locked to the threaded portion 43 in any desired position as by a lock pin 51 which extends through the outer skirt 50 into bearing engagement with the threaded portion 43 and has a flat end wall 49a parallel to wall 47a. Other conventional means may, of course, be provided to provide the particular interlock to create a positive positioning of the seal bar unit while permitting the release thereof for repositioning of the unit in accordance with the requirements of the web, the sealing temperature and the like.

The opposed end faces or walls 47a and 49a of the end of tube 45 and the opposed end of the nut 49 are flat and define the contact surfaces of the two members for positioning the seal bar unit 20 in the sealing position.

As a result of this construction, the piston rod 40 including the threaded portion 43 also moves with the piston 34. The interconnected threaded portion 43 and stop member 48 are correspondingly positioned with the piston.

With fluid supplied to the chamber of the cylinder unit, the piston 34 and the interconnected rod and the substantially stationary sealed bar unit 20 move outwardly into the sealing position. Retraction of the piston 34, of course, spaces the stationary seal bar unit from the web line for purposes previously noted.

As the piston 34 moves to the seal position, the stop nut 49 moves correspondingly toward the end wall 47a of the stop tube 45 and at the set point engage the walls 47a and 49a and thereby determines and sets the position of the substantially stationary seal bar unit 30, and in particular, the seal bar 22 in the relative desired operating position. The stop tube 45 may be provided with scale markings 52 relative to the nut 49 and its skirt 50 for convenient setting of the stop assembly.

All the spaced cylinder units 28 will be adjusted to a proper setting and the common connection to the air supply to accurately and precisely locate the seal bar unit in the desired horizontal position for effective and operative engagement with the web.

The cylinder unit with the integrated positioning adjustment produces a highly cost effective method and system for accurate positioning of the seal bar unit.

Although various materials may be used in the adjustable positioning control assembly, the inventor has found use of a blackened steel for the adjustment nut, a black anodized aluminum for the skirt, a blue anodized aluminum for the stop tube and a red anodized aluminum for the nut stop to provide a particularly practical and long life structure.

The stop system may, of course, be constructed in any other suitable manner which cooperates with the moving part of the cylinder of the positioning cylinder unit to accurately control the position established thereby. The preferred construction provides for a fixed cylinder and a moveable piston rod with some means interconnected between the cylinder and the piston rod to control and set the operating positioning of the piston and thereby the seal bar unit 20, and in particular, the seal bar 22. The illustrated embodiment defines a very rugged and long life system which can be reliably supplied and used in the environment of high speed web sealing apparatus.

Although shown in the preferred embodiment applied to a cross sealer, the invention with the control and the seal bar may be constructed to located the seal bar units longitudinally of the web for providing a corresponding in-line seal along or at any angle in the web or webs passing through the unit, as disclosed in the parent application.

The present invention provides a stationary seal bar assembly with means to accurately locate the assembly and provide improved movement during the sealing cycle.

We claim:

1. A plastic sealing apparatus for forming an elongated seal within the plastic web, said plastic sealing apparatus comprising a rigid support structure having a first wall member and a second wall member, upper and lower seal bar units secured to said wall members and extending in spaced aligned relation, said seal bar units defining a plastic web path therebetween, a first of said upper and lower seal bar units being mounted for movement and defining a movable seal bar unit for movement into sealing engagement with the second of said seal bar units, said second seal bar insert mounted for forming a substantially stationary seal bar unit, comprising the improvement including:

a drive system mounted to said support structure and coupled to said movable seal bar unit for moving said movable seal bar unit into said sealing engagement with said web and pressing said web into engagement with the opposed stationary seal bar unit, a plurality of laterally spaced fluidic cylinder units coupled to said support structure and coupled to said substantially stationary seal bar unit, each said fluidic cylinder unit including a cylinder having a front wall and a back wall, said back wall being fixed to said support structure, a piston within said cylinder having a piston rod extending from the front wall and coupled to said substantially stationary seal bar unit, said fluidic cylinder units having a fluidic input for receiving of fluid within said cylinder between said piston and said back wall of said cylinder, and a second piston rod secured to said piston and projecting outwardly through said back wall of said cylinder unit, and, an adjustable unit secured to said second piston rod for varying the position of said second piston rod and said piston relative to said back wall and thereby varying the position of said first piston rod and said substantially stationary seal bar unit in position relative to said moveable seal bar unit, each said fluidic cylinder unit providing for the spacing of the seal bar unit in a non-operative position and in an adjustable operative position, said substantially stationary seal bar unit providing limited retractive movement with respect to said movable seal bar unit to allow some slight penetration and lost motion during the sealing engagement of the moveable seal bar unit and the substantially stationary seal bar unit.

2. The plastic sealing apparatus of claim 1 wherein at least two of said cylinder units having the pistons fixed to said stationary seal bar unit.

3. The plastic sealing apparatus of claim 2 wherein the pistons of additional fluidic cylinder units engage and support said stationary seal bar unit.

4. The plastic sealing apparatus of claim 1 wherein said substantially stationary seal bar unit includes a seal bar, a rigid support beam aligned with and secured to the said seal bar, and wherein said second piston rod is connected to said rigid support beam.

5. The plastic sealing apparatus of claim 1 where said first piston member is secured to said support structure and includes a bottom support member, each cylinder of each of said cylinder units being secured fixedly to said bottom support member, said second piston rod extending upwardly through an opening in said support member and having an outer exposed end, an adjustable stop assembly secured to said exposed end for selectively positioning said stop assembly relative to said bottom support member and for controlling the positioning movement of said piston and thereby selectively varying the operative position of said seal bar unit.

6. The apparatus of claim 5 including a bearing member located within said bottom support member, said second positioning rod extending through said bearing member, said stop assembly including a tubular stop member telescoped over said second piston rod and abutting the bottom support member and said bearing member, the outer end of said second piston rod including a threaded portion, a threaded cap member rotatably secured on said threaded member and having an axially projecting portion extending through said tubular stop member and configured to move into engagement with said stop member upon predetermined outward movement of the piston and said piston rod to precisely locate the position of said seal bar unit in the sealing position.

7. The plastic forming apparatus of claim 6 wherein said threaded nut member includes means to lock the nut in predetermined orientation on said threaded rod.

8. The apparatus of claim 7 wherein said tubular stop member has a base portion abutting said support member and a reduced tapered portion extending therefrom to an outer reduced diameter tubular portion, and said threaded stop member being a cup shaped member having a base threaded onto said rod and an upwardly projecting skirt telescoped over said outer reduced diameter tubular portion, said base being spaced from said reduced diameter tubular portion and establishing interengagement of the base with said outer reduced diameter tubular portion and moving into engagement therewith upon the predetermined outward movement of the piston and thereby establishing said precise location of the position of the seal bar unit in the sealing position.

9. The apparatus of claim 1 wherein each of said cylinder units is constructed to include a fluid supply between the piston and said bottom wall to establish a cushion support of the substantially stationary seal bar unit in the retracted position of said cylinder unit.

10. The apparatus of claim 3 wherein said pistons of said additional cylinder units include pads abutting the bottom side of said stationary seal bar unit.

11. The apparatus of claim 10 wherein said stationary seal bar unit includes a support beam having a bottom wall, said pistons fixed to said stationary seal bar units each secured by a threaded projection and coupling next to said bottom wall, and additional cylinder units include a pad secured to the end of the piston and abutting said bottom wall.

* * * * *